United States Patent

Addor et al.

[15] 3,681,505
[45] Aug. 1, 1972

[54] METHOD OF CONTROLLING INSECTS AND ACARINA WITH CYANOALKYLALDOXIME CARBAMATES

[72] Inventors: Roger Williams Addor; David Edgar Ailman, both of Pennington, N.J.

[73] Assignee: American Cyanamid Company, Stamford, Conn.

[22] Filed: April 15, 1971

[21] Appl. No.: 134,426

Related U.S. Application Data

[62] Division of Ser. No. 812,325, April 1, 1969, Pat. No. 3,621,049.

[52] U.S. Cl. ................................................ 424/327
[51] Int. Cl. ................................................ A01n 9/20
[58] Field of Search .................................... 424/327

Primary Examiner—Albert T. Meyers
Assistant Examiner—Dale R. Ore
Attorney—Robert P. Raymond

[57] ABSTRACT

Insecticidal and acaricidal compounds are provided having the formula:

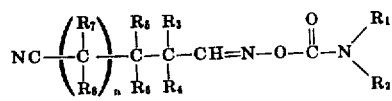

wherein:
$R_1$ and $R_2$ are each selected from the group consisting of hydrogen, lower alkyl, and allyl, provided that when either $R_1$ or $R_2$ is hydrogen, the other substituent must be lower alkyl or allyl, and $R_3$, $R_4$, $R_5$, $R_6$, $R_7$, and $R_8$ are each selected from the group consisting of lower alkyl, hydrogen and phenyl, and $n$ is 0 or 1.

The above compounds are prepared by a variety of process routes from novel cyanoalkylaldoxime intermediates of the formula:

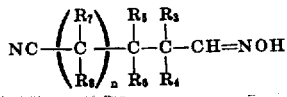

wherein $R_3, R_4, R_5, R_6, R_7$, $R_8$ and $n$ are as defined above.

4 Claims, No Drawings

METHOD OF CONTROLLING INSECTS AND ACARINA WITH CYANOALKYLALDOXIME CARBAMATES

This application is a divisional of application Ser. No. 812,325, filed Apr. 1, 1969, now U.S. Pat. No. 3,621,049.

SUMMARY OF THE INVENTION

This invention relates to storage stable cyanoalkylaldoxime carbamates represented by the formula:

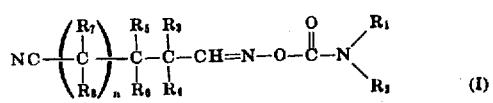

(I)

wherein:
$R_1$ and $R_2$ are each selected from the group consisting of hydrogen, lower alkyl, and allyl, provided that when either $R_1$ or $R_2$ is hydrogen, the other substituent must be lower alkyl or allyl, $R_3$, $R_4$, $R_5$, $R_6$, $R_7$ and $R_8$ are each selected from the group consisting of lower alkyl, hydrogen, and phenyl, and $n$ is 0 or 1.

This invention also relates to the use of the above compounds as insecticides and acaricides.

This invention further relates to novel cyanoalkylaldoximes represented by the formula:

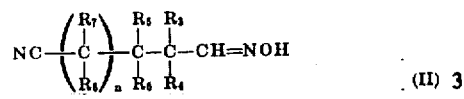

(II)

wherein $R_3$, $R_4$, $R_5$, $R_6$, $R_7$, $R_8$, and $n$ are as defined above. These compounds (II) are useful as intermediates in preparing the insecticidal and acaricidal cyanoalkylaldoxime carbamates (I) described above.

The term "lower alkyl" means straight and branched chain alkyl radicals containing from one to three carbon atoms; illustrative members are methyl, ethyl, n-propyl, and isopropyl.

PRIOR ART

The following references represent the closest prior art known to applicants:
1. U. S. Pat. No. 3,217,037
2. U. S. Pat. No. 3,400,153
3. "The synthesis and Insecticidal Properties of Some Cholinergic Trisubstituted Acetaldehyde O-(Methyl-carbamoyl)oximes," Payne et al., J. Agr. Food Chem., Vol. 14, No. 4, July-August, 1966, pgs. 356–365.

DESCRIPTION OF THE PREFERRED EMBODIMENTS

Compounds

The following compounds are illustrative of the cyanoalkylaldoxime carbamates of this invention ( reference to compound I ).

| $R_1$ | $R_2$ | $R_3$ | $R_4$ | $R_5$ | $R_6$ | $R_7$ | $R_8$ | n |
|---|---|---|---|---|---|---|---|---|
| $CH_3$ | H | H | H | H | H | — | — | 0 |
| $C_2H_5$ | H | $CH_3$ | H | H | H | — | — | 0 |
| $CH_3$ | $CH_3$ | $C_6H_5$ | H | H | H | — | — | 0 |
| $C_3H_5$ | $C_2H_5$ | $C_6H_5$ | H | H | H | — | — | 0 |
| $CHCH$ | $CH_3$ | H | $CH_3$ | $CH_3$ | H | H | — | — | 0 |
| $i$-$C_3H_7$ | H | $CH_3$ | H | $CH_3$ | H | — | — | 0 |
| $C_3H_5$ | $C_2H_5$ | H | H | $CH_3$ | H | — | — | 0 |
| $CH_3$ | $CH_3$ | H | H | $C_2H_5$ | H | — | — | 0 |
| $CH_3$ | $CH_3$ | H | H | H | $CH_3$ | — | — | 0 |
| $CH_3$ | $CH_3$ | $C_2H_5$ | H | H | H | — | — | 0 |
| $CH_3$ | H | H | H | H | H | $CH_3$ | $CH_3$ | 1 |
| $C_2H_5$ | H | $CH_3$ | $CH_3$ | H | H | $CH_3$ | H | 1 |
| $n$-$C_3H_7$ | H | $C_2H_5$ | $C_2H_5$ | H | H | $CH_3$ | H | 1 |
| $CH_3$ | $CH_3$ | $C_2H_5$ | H | $CH_3$ | H | H | H | 1 |
| $CH_3$ | H | $C_2H_5$ | $CH_3$ | $CH_3$ | H | H | H | 1 |
| $CH_3$ | $C_2H_5$ | $i$-$C_3H_7$ | $CH_3$ | H | H | $C_2H_5$ | H | 1 |
| $CH_3$ | $CH_3$ | $CH_3$ | $CH_3$ | H | H | $C_2H_5$ | H | 1 |
| $n$-$C_3H_7$ | $n$-$C_3H_7$ | H | H | $CH_3$ | $CH_3$ | H | H | 1 |

Certain cyanoalkylaldoxime carbamates of this invention are characterized by a high degree of stability during prolonged storage. For example, the compounds have shown substantially no decomposition after storage intervals of at least 3 months at ambient conditions of temperature and humidity.

The following compounds are illustrative of the cyanoalkylaldoximes of this invention ( reference to compound II ).

| $R_3$ | $R_4$ | $R_5$ | $R_6$ | $R_7$ | $R_8$ | n |
|---|---|---|---|---|---|---|
| H | H | H | H | — | — | 0 |
| $CH_3$ | H | H | H | — | — | 0 |
| $C_2H_5$ | H | H | H | — | — | 0 |
| $CH_3$ | H | H | H | — | — | 0 |
| $CH_3$ | $CH_3$ | H | H | — | — | 0 |
| $CH_3$ | H | $CH_3$ | H | — | — | 0 |
| H | H | $CH_3$ | H | — | — | 0 |
| H | H | $C_2H_5$ | H | — | — | 0 |
| H | H | $C_6H_5$ | $CH_3$ | — | — | 0 |
| H | H | H | H | — | — | 0 |
| $C_2H_5$ | H | H | H | $CH_3$ | $CH_3$ | 1 |
| H | H | H | H | $CH_3$ | H | 1 |
| $CH_3$ | $CH_3$ | H | H | $CH_3$ | H | 1 |
| $C_2H_5$ | $C_2H_5$ | H | H | H | H | 1 |
| $C_2H_5$ | H | $CH_3$ | H | H | H | 1 |
| $C_2H_5$ | $CH_3$ | H | H | $C_2H_5$ | H | 1 |
| $i$-$C_3H_7$ | $CH_3$ | H | H | $C_6H_5$ | H | 1 |
| $CH_3$ | $CH_3$ | H | H | $C_6H_5$ | H | 1 |
| H | H | $CH_3$ | $CH_3$ | H | H | 1 |

Processes

The cyanoalkylaldoxime carbamates (I) of this invention wherein $R_1$ and $R_2$ are not both lower alkyl or allyl are readily prepared by reacting a novel cyanoalkylaldoxime of the formula:

$$NC-\left(\underset{R_8}{\overset{R_7}{C}}\right)_n-\underset{R_6}{\overset{R_5}{C}}-\underset{R_4}{\overset{R_3}{C}}-CH=NOH$$

(II)

wherein $R_3$, $R_4$, $R_5$, $R_6$, $R_7$, $R_8$, and $n$ are as previously defined, with an isocyanate of the formula, $R_1NCO$, wherein $R_1$ is as previously defined in the presence of an inert solvent and a catalytic amount of an organic amine (i.e., triethylamine) catalyst.

The cyanoalkylaldoximes ( II ) are themselves novel compounds which find utility as intermediates in the production of the insecticidal and acaricidal cyanoalkyladloxime carbamates ( I ) of this invention. The starting cyanoalkylaldoxime ( II ) is prepared by the reaction of a cyanoalkylaldehyde of the formula:

$$NC-\left(\underset{R_8}{\overset{R_7}{C}}\right)_n-\underset{R_6}{\overset{R_5}{C}}-\underset{R_4}{\overset{R_3}{C}}-CH=O$$

(III)

with hydroxylamine wherein $R_3$, $R_4$, $R_5$, $R_6$, $R_7$, $R_8$ and $n$ are as defined above in the presence of an inert solvent and about one mole of a base such as sodium acetate, pyridine, sodium bicarbonate, or calcium carbonate.

The required cyanoalkylaldehydes (III) are either readily available or can be readily prepared from known starting materials in accordance with procedures known to those skilled in the art. The preparation of a typical cyanoalkylaldehyde (III) is exemplified in Example A hereinbelow.

The compounds of this invention wherein $R_1$ and $R_2$ are both lower alkyl or allyl are conveniently prepared by either of two processes. In the first process, the cyanoalkylaldoxime (II) shown above is reacted with a di-substituted carbamoyl chloride of the formula:

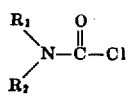

in the presence of about 1 mole of a base such as potassium-t-butoxide or sodium methoxide wherein $R_1$ and $R_2$ are as previously defined.

In the second process, the cyanoalkylaldoxime (II) shown above is reacted first with phosgene (IV) in the presence of an inert solvent and about one mole of a base such as 2,6-lutidine or potassium t-butoxide to produce an intermediate chlorocarbonate (V) in accordance with the following equation:

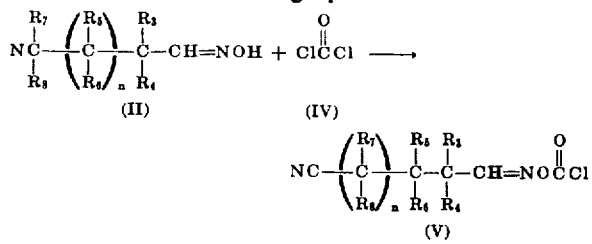

Compound (V) is thereupon reacted with a mono or di-substituted amine (VI) of the formula, $R_1R_2NH$ (wherein all substituents are as defined previously), in the presence of an inert solvent and about one mole of a base such as $R_1R_2NH$ itself or aqueous sodium hydroxide to produce the desired product (VII) in accordance with the following equation:

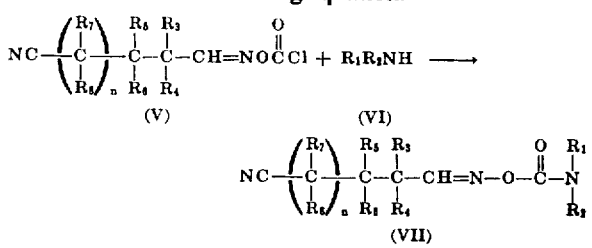

Suitable inert reaction solvents for carrying out the above reactions include benzene, toluene, ethylene chloride, acetone, and t-butanol.

Reaction temperatures may range from 0° to 75° C. with a range of 20°–50° C. preferred. The reactions may be run under superatmospheric, atmospheric, or sub-atmospheric pressure with atmospheric pressures preferred.

UTILITY

The cyanoalkylcarbamates of this invention are useful for controlling a variety of insects and acarina such as those shown in Examples 22, 23, and 24 hereinbelow. The compounds are particularly effective against aphids and mites. These two pest species are often found in the same environment but are known to be difficult to control with a single chemical since the mites, in particular, build up a resistance to phosphorus-containing insecticides. The inventive compounds are also most effective against ticks.

They are highly effective when applied to domestic animals such as cattle, pigs, and sheep which are infested with insects or acarina, and particularly when applied to animals infested with arthropods such as ticks, by the use of dipping vats, sprays, spray-races, dusts, and other methods known to those skilled in the art.

They may be applied to the foliage of plants as dusts or liquid sprays to protect them from insects and mites which feed thereon; they may also be incorporated in or applied to the soil in order to protect germinating and growing plants from soil-borne pests which attack the root systems and stems of said plants; or they may be applied to the breeding sites of pests to control both the larvae and adult stages of breeding pest populations. In the latter situations the compounds may be applied in conventional formulations such as dust, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica, charcoal, activated carbon or other inert powders. AS a wettable powder, the compounds of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of hydrocarbon solvent such as Panasol AN–5, Socal 44–L or Esso HAN (all commercially available).

The compounds of this invention may also be applied in combination with other essentially technical materials, such as malathion, which in addition to having insecticidal properties also serve as a formulation vehicle.

The cyanoalkylaldoximes derive their utility as intermediates in the preparation of the useful cyanoalkylaldoxime carbamates. This utility is amply shown in Examples 10 through 21 hereinbelow.

The following examples are provided to further illustrate the invention.

EXAMPLE A (PRIOR ART)

Preparation of 2,2-Dimethyl-4-cyanopentanal

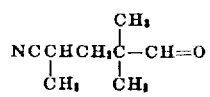

A stirred mixture of 7.2 g. of isobutyraldehyde, 6.7 g. of α-methylacrylonitrile, and 10.0 g. of a basic ion exchange resin (Rexyn CGL in the OH form) was heated at about 75° C. for 6 hours. The mixture was then cooled, filtered, and concentrated under vacuum.

EXAMPLE 1

Preparation of 2,2-dimethyl-4-cyanobutyraldoxime

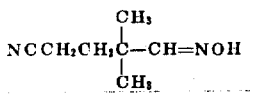

A solution of 32 g. of hydroxylamine hydrochloride in 45 ml. of water was added to a solution containing 44.0 g. of 2,2-dimethyl-b 4-cyanobutyraldehyde, b.p. 82°–85C. ( 2.0 mm. ), and 36 g. of pyridine in 450 ml. of alcohol gave a mildly exothermic reaction. The solution was warmed to 45° C. to complete the reaction, concentrated to remove alcohol, diluted with water and the oxime isolated by extraction with benzene, washing and evaporation. The oxime ( 37.0 g. ) was obtained as a straw colored oil which solidified at room temperature. Analysis, calculated for $C_7H_{12}N_2O$ : 19.99 percent N; Found 20.17% N.

EXAMPLE 2

Preparation of 2,2-Dimethyl-4-cyanopentanaloxime

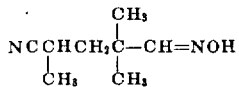

Following the same procedure used to prepare 2,2-dimethyl-4-cyanobutyraldoxime ( i.e., Example 1 ) but replacing 2,2-dimethyl- 4-cyanobutyraldehyde with 2,2-dimethyl-4-cyanopentanal ( as prepared in Example A ) gave a 60 percent yield of crude product, m.p. 33°–36° C. A sample, recrystallized from chloroform-petroleum ether at about –60° C., gave colorless crystals, m.p. 37.0°–39.0° C.

Anal. Calc'd. for $C_8H_{14}N_2O$ : C, 62.4; H, 9.1; N, 18.2. Found: C, 61.3; H, 9.3; N, 17.4.

EXAMPLE 3

Preparation of 2-Ethyl-2-methyl-4-cyanobutyraldoxime

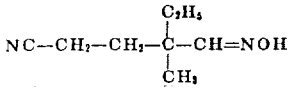

Following the same procedure used to prepare 2,2-dimethyl-4-cyanobutyraldoxime ( i.e., Example 1 ) but replacing 2,2-dimethyl-4-cyanobutyraldehyde with 2-ethyl-2-methyl-4-cyanobutyraldehyde gave an 85.7 percent yield of product melting below room temperature.

Anal. Calc'd. for $C_8H_{14}N_2O$ : C, 62.3; H, 9.2; N, 18.2 Found: C, 61.5; H, 9.3; N, 17.8

EXAMPLE 4

Preparation of 2-Methyl-2-Phenyl-4-Cyanobutyraldoxime

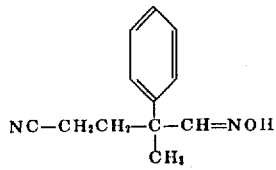

Following the procedure used to prepare 2,2-dimethyl-4-cyanobutyraldoxime ( i.e., Example 1 ) but replacing 2,2-dimethyl-4-cyanobutyraldehyde with 2-methyl-2-phenyl-4-cyanobutyraldehyde gave, from 45.0 g. of the aldehyde, 42.3 g. of the oxime as a pink oil.

Anal. Calc'd. for $C_{12}H_{14}N_2O$: c, 71.26; H, 6.98 N, 13.85.
Found: C, 70.8; H, 6.8; N, 13.4.

EXAMPLE 5

Preparation of 2,2-Diethyl-3-cyanobutyraldoxime

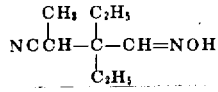

The above product was prepared following substantially the same procedure as in Example 1 except that the 2,2-dimethyl-4-cyanobutyraldehyde was replaced with 2,2-diethyl-3-cyanobutyraldehyde.

EXAMPLE 6

Preparation of 2,3,3-trimethyl-4-cyanopentanaloxime

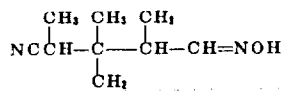

The above product was prepared following substantially the same procedure as in Example 1 except that the 2,2-dimethyl-4-cyanobutyraldehyde was replaced by 2-methyl-3,3-dimethyl-4-cyanopentanal

EXAMPLE 7

Preparation of 2,2-dimethyl-4-cyano-4-phenylbutyraldoxime -phenylbutyraldoxime

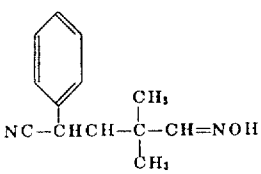

The above product was prepared following substantially the same procedure as in Example 1 except that the 2,2-dimethyl-4-cyanobutyraldehyde was replaced with 2,2-dimethyl-4-cyano-4-phenylbutyraldehyde.

EXAMPLE 8

Preparation of 3Cyanopropionaldoxime

The above product was prepared following substantially the same procedure as in Example 1 except that the 2,2-dimethyl-4-cyanobutyraldehyde was replaced with 3-cyanopropionaldehyde.

EXAMPLE 9

Preparation of 2-Ethyl-3-cyanobutyraldehyde

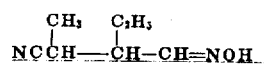

The above product was prepared following substantially the same procedure as in Example 1 except that the 2,2-dimethyl-4-cyanobutyraldehyde was replaced with 2-ethyl-3-cyanobutyraldehyde.

EXAMPLE 10

Preparation of 2,2-Dimethyl-4-cyanobutyraldoxime-N-methylcarbamate

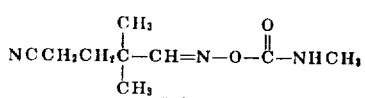

To a stirred mixture of 37.0 g. of 2,2-dimethyl-4-cyanobutyraldoxime in 175 ml. of benzene was added to 17.5 g. of methyl isocyanate followed by 0.2 ml. of triethylamine. A very mildly exothermic reaction occurred. Infrared absorption spectra indicated reaction was complete in 3.5 hours at room temperature. After partial concentration of the mixture under vacuum to remove any unreacted methyl isocyanate, it was diluted with benzene and ether, washed with water and with saturated salt solution and dried with magnesium sulfate. The carbamate was recovered by evaporation of solvent and crystallized from ether to obtain 42 g. of white solid, m.p. 42.5°–43° C.

Anal. Calc'd. for $C_9H_{15}N_3O_2$: 21.31% N
Found: 21.09% N

EXAMPLE 11

Preparation of 2,2-Dimethyl-4-cyanobutyraldoxime-N,N-dimethylcarbamate

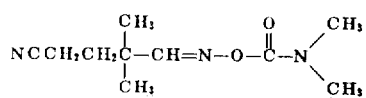

To a stirred mixture of 9.1 g. of 2,2-dimethyl-4-cyanobutyraldoxime and 7.4 g. of potassium t-butoxide in 250 ml. of t-butyl alcohol was added 7.0 g. of dimethylcarbamoyl chloride over about a 10 minute period. The temperature was kept at 25°–30° C. by using a cooling bath. After an additional hour most of the t-butyl alcohol was removed under vacuum and the residue was partitioned between benzene and water. The water phase was extracted once more with benzene and the combined organic layers were then washed successively with small amounts of water and saturated salt solution. After drying the benzene mixture over magnesium sulfate, the mixture was filtered and concentrated in vacuo to give 10.9 g. of crude crystalline product. Recrystallization from about 250 ml. of ether afforded 7.3 g. of colorless crystalline product, m.p. 73°–75°C.

Anal. Calc'd. for $C_{10}H_{17}N_3O_2$: C, 56.85; H, 8.11; N, 19.89.
Found: C, 56.85; H, 8.14; N, 19.95.

EXAMPLE 12

Preparation of 2,2-Dimethyl-4-cyanobutyraldoxime-N-ethylcarbamate

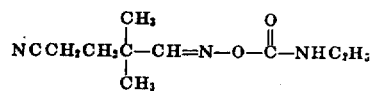

The procedure was the same as that used for preparing the N-methylcarbamoyl derivatives (i.e., Example 10) except ethyl isocyanate replaced methyl isocyanate. The product was obtained as a pale tan oil in 73 percent yield.

Anal. Calc'd. for $C_{10}H_{17}N_3O_2$: C, 56.85; H, 8.11; N, 19.89.
Found: C, 57.76; H, 8.70; N, 19.61.

EXAMPLE 13

Preparation of 2,2-Dimethyl-4-cyanobutyraldoxime-N-allylcarbamate

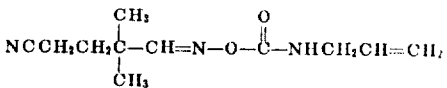

The procedure was the same as that used for preparing the N-methylcarbamoyl derivative (i.e., Example 10) except that allyl isocyanate replaced methyl isocyanate. The product was obtained in 89 percent yield as a yellow oil.

Anal. Calc'd. for $C_{11}H_{17}N_3O_2$: C, 59.17; H, 7.68; N, 18.82.
Found: C, 59.91; H, 8.23; N, 19.60.

EXAMPLE 14

Preparation of 2,2-Dimethyl-4-cyanopentanaloxime-N-methylcarbamate

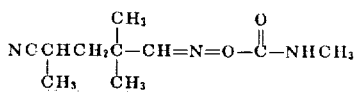

The procedure was that used to prepare 2,2-dimethyl-4-cyanobutyraldoxime-N-methylcarbamate (i.e., Example 10) except that 2,2-dimethyl-4-cyanopentanaldoxime (as prepared in Example 2) replaced 2,2-dimethyl-4-cyanobutyraldoxime. The yield of crude oily product was 95 percent. Further purification was effected by chromatography using a magnesium silicate column and eluting first with methylene chloride and then with ether.

Anal. Calc'd. for $C_{10}H_{17}N_3O_2$: C, 56.9; H, 8.1; N, 19.9.
Found: C, 56.5; H, 8.2; N, 18.8.

EXAMPLE 15

Preparation of 2-Ethyl-2-methyl-4-cyanobutyraldoxime-N-methylcarbamate

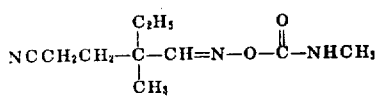

The procedure was that used to prepare 2,2-dimethyl-4-cyanobutyraldoxime-N-methylcarbamate (i.e. Example 10) except that 2-ethyl-2-methyl-4-cyanobutyraldoxime replaced 2,2-dimethyl-4-cyanobutyraldoxime. The oily product, obtained in 87 percent yield, showed only minor contamination by thin layer chromatography on silica gel using 1 percent methanol in chloroform for developing and iodine vapor for detection of spots.

Anal. Calc'd. for $C_{10}H_{17}N_3O_2$: C, 56.9; H, 8.1; N, 19.9.
Found: C, 57.8; H, 8.5; N, 19.1.

EXAMPLE 16

Preparation of 2-Methyl-2-phenyl-4-cyanobutyraldoxime-N-methylcarbamate

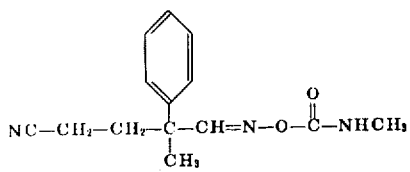

The procedure was that used to prepare 2,2-dimethyl-4-cyanobutyraldoxime-N-methylcarbamate (i.e. Example 10) except that 2-methyl-2-phenyl-4-cyanobutyraldoxime replaced 2,2-dimethy-4-cyanobutyraldoxime. The crude product from 35.0 g. of the oxime was chromatographed on magnesium silicate eluting with carbon tetrachloride and then with methylene chloride to give 28.9 g. of pure carbamate as a viscous oil.

Anal. Calc'd. for $C_{14}H_{17}N_3O_2$: C, 64.84; H, 6.61; N, 16.21.
Found: C, 65.4; H, 6.8; N, 15.8.

EXAMPLE 17

Preparation of 2,2-Diethyl-3-cyanobutyraldoxime-N-methyl(allyl)carbamate

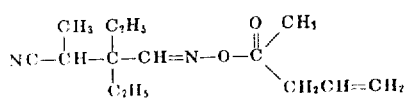

The procedure was that used to prepare 2,2-dimethyl-4-cyanobutyraldoxime-N,N-dimethylcarbamate (i.e. Example 11) except that 2,2-diethyl-3-cyanobutyraldoxime replaced 2,2-dimethyl-4-cyanobutyraldoxime and methyl(allyl)carbamoyl chloride replaced the dimethylcarbamoyl chloride. The product was isolated as an oil.

EXAMPLE 18

Preparation of 2,3,3-Trimethyl-4-cyanopentanaloxime-N,N-di-isopropylcarbamate

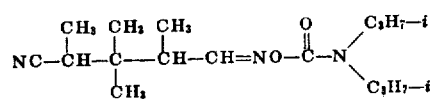

The procedure was that used to prepare 2,2-dimethyl-4-cyanobutyraldoxime-N,N-dimethylcarbamate (i.e. Example 11) except that 2,3,3-trimethyl-4-cyanopentaldoxime replaced 2,2-dimethyl-4-cyanobutyraldoxime and di-isopropylcarbamoyl chloride replaced the dimethylcarbamoyl chloride. The oily product has the expected carbonyl absorption at about 1,710 cm$^{-1}$.

EXAMPLE 19

Preparation of 2,2-Dimethyl-4-cyano-4-phenylbutyraldoxime-N-ethylcarbamate

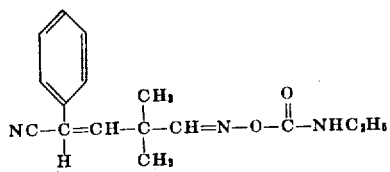

The procedure was the same as that for the preparation of 2,2-dimethyl-4-cyanobutyraldoxime-N-methylcarbamate (i.e., Example 10) except that 2,2-dimethyl-4-cyano-4-phenylbutyraldoxime replaced 2,2-dimethyl-4-cyanobutyraldoxime and ethyl isocyanate replaced methyl isocyanate. The oily product is isolated in high yield.

EXAMPLE 20

Preparation of 3-Cyanoaldoxime-N-methylcarbamate

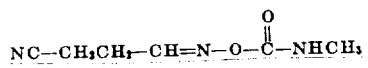

3-Cyanopropionaldoxime was reacted with methyl isocyanate in the same way as was 2,2-dimethyl-4-cyanobutyraldoxime of Example 10. The product, a low melting solid, shows the expected nitrile absorption band at about 2,250 cm$^{-1}$.

EXAMPLE 21

Preparation of 2-Ethyl-3-cyanobutyraldoxime-N,N-methyl(allyl)-carbamate

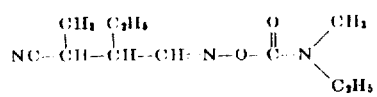

The procedure was that used to prepare 2,2-dimethyl-4-cyanobutyraldoxime-N,N-dimethylcarbamate (Example 11) except that 2-ethyl-3-cyanobutyraldoxime replaced 2,2-dimethyl-4-cyanobutyraldoxime and methyl(ethyl) carbamoyl chloride replaced dimethylcarbamoyl) chloride. The product, an oil, shows typical carbamate carbonyl absorption at about 1,700 cm$^{-1}$.

EXAMPLE 22

Efficacy Against Mites and Aphids

The efficacy of the inventive cyanoalkylaldoxime carbamates against mites and aphids was demonstrated in accordance with the following test procedures.

1. Bean aphid - *Aphis fabae* Scopoli

Compounds are tested as solutions in 65 percent acetone-35 percent water. Two-inch fiber pots, each containing a nasturtium plant 2 inches high and infested with about 150 aphids 2 days earlier, are placed on a turntable (4rpm) and sprayed for two revolutions with a No. 154 DeVilbiss Atomizer at 20 psi air pressure. The spray tip is held about 6 inches from the plants and the spray is directed so as to give complete coverage of the aphids and the plants. The sprayed plants are laid on their sides on white enamel trays. Mortality counts are made after holding for one day at 70° F., and 50% r.h.

LC-50 values are obtained in the standard manner by plotting percent mortality as a function of the compound concentration for a variety of concentrations. The term LC-50 means the compound concentration expressed in ppm required to kill 50 percent of the aphids.

2. Two-spotted spider mite - *Tetranychus urticae* (Koch)

Sieva lima bean plants with primary leaves three to four inches long are infested with about 100 adult mites per leaf four hours before use in this test. The mite and egg infested plants are dipped for three seconds in the solutions used in the above test, and the plants set in the hood to dry. They are held for two days at 80° F., 60% r.h., and the adult mite mortality counted on one leaf under a stereoscopic microscope. The other leaf is left on the plant an additional five days and then examined at 10X power to estimate the kill of eggs and of newly-hatched nymphs, giving a measure of ovicidal and residual action, respectively.

Since mites are known to develop resistance to phosphorus containing insecticides, the compounds were also tested against a strain of "phosphate resistant" mites as described below.

3. "Phosphate-Resistant" Mites

The phosphate-resistant colony of two-spotted spider mites (*Tetranychus urticae* [Koch] used were subjected to repeated treatments with a 1:1:1 mixture of dimethoate, malathion and parathion periodically over a period of 9 years. $LD_{50}$ tests showed this colony to be approximately 50 times more resistant to these chemicals than the susceptible colony. The inventive compounds were tested against these phosphate-resistant mites following the same procedure used for the susceptible mites.

Mite LC-50 values were determined in the manner described above or aphid LC-50 values.

4. Mite Systemic Tests

The compound to be tested is formulated as an emulsion containing 0.1 gram of test material, 0.2 grams of Alrodyne 315 emulsifier, 10 ml. of acetone and 90 ml. of water. This is diluted ten-fold with water to give a 100 ppm emulsion for the test. A sieva lima bean plant with only the primary leaves unfolded is cut off just above soil level and inserted into a two ounce bottle of 100 ppm emulsion and held in place by a bit of cotton wrapped around the stem. The bottle is then placed in a ventilated box with the leaves extending outside the box, such that any possible fumes from the compound will be drawn out the end of the box rather than rising to affect the test leaves. About 50 adult two-spotted spider mites are placed on each leaf. After holding three days at 80° F. and 60% r.h., mortality estimates are made.

Results are presented in Table I.

TABLE I

| Compound | Percent kill of aphids[1] at rate shown | | | | Percent kill of susceptible mites[2] at rate shown | | | | | Percent kill of phosphate resistant mites | | | |
|---|---|---|---|---|---|---|---|---|---|---|---|---|---|
| | | | | | Contact | | | | Systemic, 100 p.p.m. | | | | |
| | 1,000 p.p.m. | 100 p.p.m. | 10 p.p.m. | LC-50 (p.p.m.) | 1,000 p.p.m. | 100 p.p.m. | 10 p.p.m. | LC-50 (p.p.m.) | | 1,000 p.p.m. | 100 p.p.m. | 10 p.p.m. | LC-50 (p.p.m.) |
| CNCH₂CH₂C(CH₃)₂—CH=N—O—C(O)—NHCH₃ | 100 | 100 | 100 | .8 | 100 | 100 | 100 | 3-5 | 100 | 100 | 100 | 100 | 2-4 |
| CNCH₂CH₂C(CH₃)₂—CH=N—O—C(O)(OCH₃)(NCH₃) | 100 | 90 | 0 | ........ | 35 | 0 | 0 | ........ | 80 | 100 | 100 | 45 | ........ |
| CNCH₂CH₂C(CH₃)₂—CH=N—O—C(O)—NHCH₃ | 100 | 100 | 80 | ........ | 100 | 100 | 81 | ........ | 100 | 100 | 100 | 0 | ........ |
| CNCH₂CH₂C(CH₃)₂—CH=N—O—C(O)—NH(CH₂CH=CH₂) | 100 | 100 | 15 | ........ | 100 | 100 | 0 | ........ | 100 | 100 | 96 | 0 | ........ |
| CNCH₂CH₂C(CH₃)(C₂H₅)—C—CH=N—O—C(O)—NH(C₂H₅) | 100 | 100 | 0 | ........ | 100 | 100 | 0 | ........ | 100 | 100 | 76 | 0 | ........ |
| CNCH₂—CH(C₂H₅)—C(CH₃)₂—CH=N—O—C(O)—NHCH₃ | 100 | 100 | 85 | ........ | 90 | 90 | 0 | ........ | 100 | 100 | 91 | 0 | ........ |
| (C₂H₅O)₂P(S)O—C₆H₄—NO₂ (Parathion) | 100 | 100 | 100 | 1-2 | 100 | 100 | 90 | 8-9 | 0 | 79 | 0 | ........ | 6/60 |
| (CH₃O)₂P(S)—S—CH₂—C(O)—NHCH₃ (Dimethoate) | 100 | 100 | 100 | .8 | 100 | 100 | 100 | 5-6 | 100 | 100 | 9 | ........ | 3/60 |

[1] Black bean aphid *Aphis fabae*. [2] 2-spotted spider mite *Tetranychus urticae*.

The high activity against aphids and mites is apparent from the data of Table I. The compounds also have systemic activity against mites.

It should be noted that although the compounds of this invention exhibit activity against aphids comparable to well known insecticides such as parathion and dimethoate, they show greater activity than these two materials against susceptible mites (1.5 to 2 times greater) and remarkably greater activity (150 to 300 times) than these two compounds against a strain of phosphate resistant mites. Since mites and aphids are often found in the same environment, the activity against phosphate resistant mites is of particular importance since it permits control of aphids and phosphate-resistant mites by application of a single chemical.

EXAMPLE 23

Efficacy Against Insects

The efficacy of the inventive cyanoalkylaldoxime carbamates against insects was demonstrated in accordance with the following test procedures.

1. Large milkweed bug—*Oncopeltus fasciatus* Dallas compounds are formulated as 1 percent dusts by mixing 0.1 gram of the compound with 9.9 grams of Pyrax ABB talc, wetting with 5 ml. of acetone and grinding with a mortar and pestle until dry. 25 mg. of the 1 percent dust is sprinkled evenly over the glass bottom of a 7-inch diameter cage, using a screen-bottom plastic cup about five-eighths inch in diameter as an applicator, giving a deposit of approximately mg./sq. ft. (0.108 mg./sq. cm.) of the 1 percent dust. Water is supplied in a 2-ounce bottle with a cotton wick, twenty adult bugs are added and a screen cover placed on the top. Mortality counts are made after holding for three days at 80° F. and 60% r.h.

2. Housefly—*Musca domestica* Linnaeus

Groups of 25 adult female houseflies are lightly anesthetized with $CO_2$, placed in wide-mouthed pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10 percent sugar solution in a 10-gram glass vial, giving a concentration of 50 ppm. The mouth of the vial is covered with a single layer of cheesecloth, inverted and placed on the screen cap, so that the flies can feed on the solution through the screen. Mortality counts are made after 2 days at 80° F.

The compound of Examples 10, 12, 13, 14, and 15 killed 100 percent of the milkweed bugs while the compound of Example 11 killed 70 percent.

The compounds of Examples 10, 11, and 14 killed 100 percent, 40 percent, and 96 percent respectively, of houseflys.

EXAMPLE 24

Efficacy Against Ticks

The efficacy of the inventive cyanoalkylaldoxime carbamates of this invention for controlling ticks is demonstrated by a procedure wherein unfed nymphs of the species *Amblyomma americanum* (lone star tick) are sprayed for 30 seconds with an acetone/water solution containing 20 ppm of the test compound. EAch test group contained about 10 or more nymphs (see % kill) of a single species and all tests were replicated. The results are shown below in Table II.

TABLE II

| Compound Prepared in Example Number | 20 PPM |
|---|---|
| 10 | 100 |
| 13 | 80 |
| 14 | 91 |
| 15 | 20 |

We claim:

1. A method for controlling insects and acarina which comprises applying to said insects and acarina an insecticidally and acaricidally effective amount of at least one of the compounds of the formula.

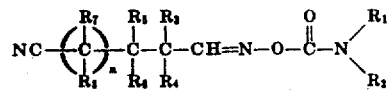

wherein:

$R_1$ and $R_2$ are each selected from the group consisting of hydrogen, lower alkyl of $C_1$ to $C_3$, and allyl, provided that when either $R_1$ or $R_2$ is hydrogen, the other substituent must be lower alkyl of $C_1$ to $C_3$ or allyl, $R_3$, $R_4$, $R_5$, $R_6$, $R_7$, and $R_8$ are each selected from the group consisting of lower alkyl of $C_1$ to $C_3$, hydrogen, and phenyl, and $n$ is 0 or 1.

2. A method for protecting vegetation from destruction by insects and acarina which comprises applying to said vegetation an insecticidally and acaricidally effective amount of at least one of the compounds of claim 1.

3. The method of claim 1 wherein said insects are aphids and said acarina are ticks and mites.

4. A method for controlling insects and acarina on domestic animals which comprises applying to the exterior of said animals an insecticidally and acaricidally effective amount of at least one compound of claim 1.

* * * * *